United States Patent [19]

Marks et al.

[11] Patent Number: 5,171,824

[45] Date of Patent: Dec. 15, 1992

[54] PROCESS FOR THE PREPARATION OF ARYLCYCLOBUTENE TERMINATED CONDENSATION POLYMERS

[75] Inventors: Maurice J. Marks; Alan K. Schrock, both of Lake Jackson, Tex.; Thomas H. Newman, Midland, Mich.

[73] Assignee: The Dow Chemical Company, Midland, Mich.

[21] Appl. No.: 632,868

[22] Filed: Dec. 24, 1990

[51] Int. Cl.$^5$ .................. C08G 64/00; C08G 63/00

[52] U.S. Cl. ................................ 528/198; 528/176; 528/179

[58] Field of Search .................. 528/176, 179, 198

[56] References Cited

U.S. PATENT DOCUMENTS

| | | | |
|---|---|---|---|
| 3,600,288 | 8/1971 | Viventi | 524/588 |
| 3,770,697 | 11/1973 | Holub et al. | 528/203 |
| 4,026,913 | 5/1977 | Tanigaichi et al. | 525/269 |
| 4,221,645 | 9/1980 | Adelmann et al. | 204/159.14 |
| 4,255,243 | 3/1981 | Coqueugniot et al. | 525/440 |
| 4,367,186 | 1/1983 | Adelmann et al. | 264/22 |
| 4,540,763 | 9/1985 | Kirchoff | 526/281 |
| 4,544,725 | 10/1985 | Priola et al. | 526/301 |
| 4,622,375 | 11/1986 | Wong | 526/284 |
| 4,638,078 | 1/1987 | Kirchoff | 558/414 |
| 4,642,329 | 2/1987 | Kirchhoff et al. | 526/284 |
| 4,661,193 | 4/1987 | Kirchhoff et al. | 156/307.3 |
| 4,667,004 | 5/1987 | Wong | 526/284 |
| 4,667,005 | 5/1987 | Wong | 526/284 |
| 4,698,394 | 10/1987 | Wong | 525/289 |
| 4,708,990 | 11/1987 | Wong et al. | 525/250 |
| 4,708,994 | 11/1987 | Wong | 525/392 |
| 4,724,260 | 2/1988 | Kirchhoff et al. | 546/112 |
| 4,743,399 | 5/1988 | Kirchhoff et al. | 252/512 |
| 4,795,827 | 1/1989 | Bruza et al. | 564/329 |
| 4,825,001 | 4/1989 | Bruza et al. | 564/328 |
| 4,864,010 | 9/1989 | Schrock et al. | 528/185 |
| 4,912,194 | 3/1990 | Rosenquist | 528/196 |
| 4,937,287 | 6/1990 | Dean | 525/152 |
| 5,028,690 | 7/1991 | Gallucci | 528/481 |

FOREIGN PATENT DOCUMENTS

| | | |
|---|---|---|
| 0006578 | 1/1980 | European Pat. Off. |
| 0092269 | 10/1983 | European Pat. Off. |
| 0187248 | 7/1986 | European Pat. Off. |
| 0273144 | 7/1988 | European Pat. Off. |
| 2757086 | 6/1978 | Fed. Rep. of Germany |
| 2746139 | 4/1979 | Fed. Rep. of Germany |
| 3513715 | 10/1986 | Fed. Rep. of Germany |
| 50-154348 | 12/1975 | Japan |
| 63-270641 | 11/1988 | Japan |
| 1-024809 | 1/1989 | Japan |
| 1-075524 | 3/1989 | Japan |

OTHER PUBLICATIONS

Lloyd et al., The Electrophillic Substitution of Benzochclobutene-II, Tetrahedron, vol. 21, pp. 245–254 (1965).

Lloyd et al., The Electrophilic Substitution of Benzochclobutene-III, Tetrahydron, vol. 21, pp. 2281–2288, (1965).

Bueche, *Physical Properties of Polymers*, Interscience Publishers, pp. 225–227 (1962).

Queslel et al., Rubber Elasticity and Characterization of Networks, *Comprehensive Polymer Science*, Pergamon Press, vol. 2, p. 282.

Andrady et al., Model Networks of End-Linked Polydimethylsiloxane Chains. XII. Dependence of Ultimate Properties on Dangling-Chain Irregularities, *Journal of Applied Polymer Science*, Bol. 26, 1829–1835 (1981).

Huang et al., Polymeric and Monomeric Aryloxy-s--triazines, Polym. Prepr. (Am. Chem. Soc., Div. Polym. Chem., Washington DC), 30(1), 348–349 1989.

Cercena et al., The Use of Aryl Cyanates as Reactive Terminal Groups for Thermally Polymerizable Oligomers, Polymer Prepr. (Am. Chem. Soc., Div. Polym. Chem., Washington DC), 25(1) 114, 1984.

Sherle et al., Oligomeric Propargyl Carbonates and Polymers Based on Them, Vysokomol. Soedin., Ser. B, 25(10), 783–787 1983 (USSR).

Shashkova et al., Some Properties of Crosslinked Polymers Obtained from Oligocarbonate Methacrylates Having Various Degrees of Oligomerization, Vysokomol. Soedin., Ser. A, 28(4) 708–713, 1986 (USSR).

Barkalov et al., Radiation-inducing Hardening of Oligocarbonate Methacrylates, Radiats. Khimiya i Tekhnol. Oligomer. Sistem, M. 3–9, Ref. Zh., Khim., 1984, Abstr. No. 14S294 (USSR).

Kolesnikov et al., Synthesis and Studies of Crosslinked Polycarbonates, Vysokomol. Soedin., Ser. A, 12(8), 1739–1744, 1970 (USSR).

Trott, G. F., Surface Modification of Polymer Structures by an Imido-alkylene Substitution Reaction. I. Polycarbonate, J. Appl. Polym. Sci., New York, 18(5) 1411–1422, 1974.

U.S. Pat. Ser. No. 633,740, filed Dec. 24, 1990, M. J. Marks et al.

*Primary Examiner*—John Kight, III
*Assistant Examiner*—T. Mosley

[57] ABSTRACT

In an improved process condensation polymers having terminal arylcyclobutene moieties are prepared. Such polymers are prepared by adding to a condensation polymerization process one or more arylcyclobutene chain terminating compounds along with the multihydric compounds and condensation polymer precursors that are typically employed in such a process. Desirably the condensation polymers have an average degree of polymerization of at least about 2, preferably at least about 3 based on multi-hydric compound. This process can be used to prepare a range of condensation polymers including polycarbonates, polyesters and polyester-carbonates. The resulting products can be easily processed and shaped into various forms and structures according to the known techniques. During or subsequent to the processing, the polymers can be crosslinked, by exposure to heat or radiation, for example, to provide crosslinked polymer compositions. These compositions have a good combination of properties, including for example, processability into shaped articles having unexpectedly good combinations of toughness, solvent resistance, ignition resistance, modulus and resistance to thermal linear expansion.

30 Claims, No Drawings

PROCESS FOR THE PREPARATION OF ARYLCYCLOBUTENE TERMINATED CONDENSATION POLYMERS

This invention relates to a novel process for the preparation of condensation polymers having at least one terminal arylcyclobutene moiety. These polymeric compositions are well suited for use in preparing molded articles, extruded articles such as sheet or film and composite materials. The process more selectively and efficiently provides a broader range of condensation polymers with terminal arylcyclobutene moieties.

BACKGROUND OF THE INVENTION

There have been several recent efforts to incorporate reactive arylcyclobutene groups in condensation polymers. For example, in U.S. Pat. No. 4,708,994 it is taught to incorporate reactive arylcyclobutene groups by means of alkylating or acylating aromatic groups of such resins with a molecule containing a reactive arylcyclobutene moiety to provide pendant arylcyclobutene moieties randomly along the polymer backbone. Unfortunately, however, these processes are not efficient or selective in incorporating reactive arylcyclobutene moieties. Moreover, the materials having random and uncontrolled crosslinking throughout the polymer backbone are found to possess generally unsatisfactory combinations of other physical properties such as toughness.

In U.S. Pat. Nos. 4,795,827 and 4,825,001 cyclobutarene ketoaniline monomers are used for attaching cyclobutarene groups to polymers or other molecules having amino-reactive functionalities, including ester- or ether-type polymers The cyclobutarene groups are then employed to form crosslinked or polymerized compositions. However, due to the requirement for amine reactivity and due to the nitrogen atoms used in creating the linking groups, the use of these monomers in condensation polymers is limited. For example, desirable carbonate-type condensation polymers having arylcyclobutene moieties could not be prepared by the technique of U.S. Pat. Nos. 4,795,827 and 4,825,001 due to the unacceptable instability of the carbamate groups that would necessarily result from the use of such monomers. In addition, the use of such a technique to prepare the arylcyclobutene-functionalized condensation polymers requires the multiple steps of preparing or otherwise obtaining the initial polymer to be functionalized followed by the separate step of attaching the cyclobutarene ketoaniline monomers.

In U.S. Pat. No. 4,864,010 benzoxazole linked bis-arylcyclobutenes are prepared from condensation reacting a cyclobutarene-carboxylic acid, a diaminodihydroxyarene, and optionally an aromatic diacid or diacid chloride.

It would therefore be desirable to have an improved, efficient process for preparing a broad range of carbonate- and/or ester-type condensation polymers having terminal arylcyclobutene moieties and possessing good combinations of product properties, including toughness, solvent resistance, heat resistance, and thermal stability.

SUMMARY OF THE INVENTION

Therefore, in one aspect the invention is a process for the preparation of a condensation polymer based on one or more multi-hydric compounds which condensation polymer has one or more terminal arylcyclobutene moieties, the process comprising the step of adding to a condensation polymerization process one or more arylcyclobutene chain terminating compounds. In another aspect the condensation polymer is a carbonate polymer, a polyester or a polyestercarbonate.

In another aspect the present invention is a condensation polymerization process comprising the steps of:
a. supplying to a reaction vessel a reaction mixture comprising (i) a multi-hydric compound: (ii) a condensation polymer precursor: and (iii) about 0.01 to about 1 mole of arylcyclobutene chain terminating compound per mole of multi-hydric compound: (i), (ii) or (iii) being supplied independently or in combinations of two or more:
b. maintaining the reaction mixture under condensation polymerization conditions: and
c. recovering from the reaction mixture a condensation polymer having terminal arylcyclobutene moieties.

The arylcyclobutene-functionalized condensation polymers prepared according to the present invention can be easily handled and processed according to the techniques generally utilized with the known condensation polymer resins and, when subjected to sufficient cross-linking conditions, result in shaped articles having improved combinations of physical properties such as heat resistance, solvent resistance, toughness and thermal stability. Depending upon the molecular weight of the condensation polymers, different product properties can be optimized and improved while maintaining the balance of processability and product properties at the good levels that are expected for carbonate polymer resins. Depending on the particular condensation polymers desired and the reactivity of the arylcyclobutene chain terminating compound and condensation polymer precursor used, the order of adding reactants i, ii and iii in step "a" above can be used to optimize the process and the product produced.

DETAILED DESCRIPTION OF THE INVENTION

Condensation polymers, including for example, polycarbonates, polyesters and polyestercarbonates, are well known to those skilled in the art. In general, the condensation polymers can be prepared from one or more multi-hydric compounds by reacting the multi-hydric compound(s) such as a dihydric phenol (or its condensation reactive derivative such as its metal phenolate) with a condensation reactive precursor.

For the preparation of carbonate polymers, the carbonate precursors are well known and include phosgene, a haloformate or a carbonate ester such as diphenyl carbonate. Carbonate polymers are well known in the literature and can be prepared by well known techniques. See for example U.S. Pat. Nos. 2,970,131: 2,999,835: 2,999,846: 3,028,365: 3,148,172: 3,153,008: 3,248,414: 3,271,367: 3,334,154: 3,912,687: 4,182,726: 4,286,085 4,384,108: 4,452,968: 4,529,791 and 4,954,613: which are all incorporated herein by reference. In particular, U.S. Pat. Nos. 3,912,687: 4,286,085: 4,384,108 and 4,529,791 illustrate interfacial processes and U.S. Pat. Nos. 4,182,726: 4,452,968 and 4,954,613 illustrate melt-type processes which would be preferred for preparing the carbonate polymers.

In general, the carbonate polymers can be prepared from one or more multi-hydric compounds by reacting the multi-hydric compound(s) such as a dihydric phenol with a carbonate precursor such as phosgene, a haloformate or a carbonate ester such as diphenyl carbonate. The use of a dihydric phenol results in an aromatic carbonate polymer, the most typical of the carbonate polymers. Generally speaking, such carbonate polymers possess reoccurring structural units according to formula I:

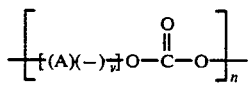

where n is the degree of polymerization: A is a radical having at least 2 valences which is a remnant of a multi-hydric compound, (—) represents valences of A connecting to a carbonate moiety as shown and v is the number of valences of A in excess of 1, an integer greater than or equal to 1. In general A is predominantly a dihydric compound remnant (v is 1) but, if branched polymers are intended, A can also be a tri-or tetra-hydric compound remnant (v is 2 or 3, respectively) at low levels Dihydric phenols are preferred multi-hydric compounds. The use of a dihydric phenol results in an aromatic carbonate polymer, the most typical of the carbonate polymers The carbonate polymer molecules are usually terminated with the remnant of a monohydric compound or other monofunctional chain terminating compound.

For the aromatic carbonate polymers of the types which are currently commercially available and most often employed in thermoplastic molding applications, n is usually from about 30 to 315, representing aromatic polycarbonates with weight average molecular weights of from 20,000 to 200,000. See for example, "Polycarbonates", Encyclopedia of Polymer Science and Technology, Vol. 11, p. 648 (1987).

According to the present invention, however, where the carbonate polymers are prepared with the arylcyclobutene moieties and prior to crosslinking, n can advantageously be from 2 to 100, representing aromatic carbonate polymer molecular weights (uncrosslinked) of from 500 to 65,000. In general, the degree of polymerization for a particular carbonate polymer resin according to the present invention depends on the average number of terminal arylcyclobutene moieties per polymer molecule. Carbonate polymers having two or more terminal arylcyclobutene moieties per chain usually become heavily crosslinked to drastically increase the effective molecular weight and provide the desired balance of physical properties. Such polymers need only a low degree of polymerization in the precrosslinked phase. Branched carbonate polymers can be prepared from a carbonate polymer having less than two arylcyclobutene units per chain and a molecular weight within the ranges generally desired for branched carbonate polymers.

Generally, therefore, the precrosslinking degree of polymerization for the carbonate polymers prepared in the process according to this invention is at least about 2, preferably greater than about 2, more preferably at least about 2.5, and most preferably at least about 3. The precrosslinking degree of polymerization for the carbonate polymers prepared by the process according to this invention is generally up to about 50, preferably less than or equal to about 35, more preferably less than or equal to about 30, and most preferably less than or equal to about 20.

For condensation polymers the degrees of polymerization can be calculated and obtained in accordance with the well known Flory equations, as reproduced below:

$$n=(1+r)/(1+r-2pr) \quad r=X_a/(X_a+2X_t)$$

where n is the degree of polymerization, r is the mole ratio of reactive groups, p is the extent of reaction, $X_a$ is the mole fraction of the dihydric chain extending compound and $X_t$ is the mole fraction of the monohydric chain terminating compound. See P. J. Flory, "Principles of Polymer Chemistry", Cornell Univ. Press, Ithaca, New York, p. 92 (1953).

The dihydric phenols which are preferably employed to provide the aromatic carbonate polymers may contain one or more aromatic rings and contain as functional groups two or more hydroxyl moieties which are reactive with the carbonate precursor compound, each of which hydroxyl moiety is preferably attached directly to a carbon atom of an aromatic ring.

Typical dihydric phenols are 2,2-bis-(4-hydroxyphenyl)-propane ("Bisphenol A"): hydroquinone: resorcinol: 2,2-bis-(4-hydroxyphenyl)-pentane: 2,4'-dihydroxy diphenyl methane: bis-(2-hydroxyphenyl) methane: bis-(4-hydroxyphenyl)-methane: bis(4-hydroxy-5-nitrophenyl)-methane: 1,1-bis-(4-hydroxyphenyl)-ethane: 3,3-bis-(4-hydroxyphenyl)-pentane: 2,2'-dihydroxydiphenyl; 2,6-dihydroxy naphthalene: bis-(4-hydroxypehnyl) sulfone: 2,4'dihydroxydiphenyl sulfone: 5'-chloro-2,4'-dihydroxydiphenyl sulfone: bis-(4-hydroxyphenyl) diphenyl disulfone: 4,4'-dihydroxydiphenyl ether: 4,4'-dihydroxy-3,3'-dichloro diphenyl ether: and 4,4'-dihydroxy-2,5-diethoxydiphenyl ether. The preferred carbonate polymerization process uses a dihydric phenol, preferably Bisphenol A, as the multihydric compound.

It is possible to employ a trihydric and/or tetrahydric phenol compound, as illustrated by the trihydric and/or tetrahydric phenols shown in U.S. Pat. No. 3,544,514, to prepare a randomly branched carbonate polymer. The randomly branched chain polycarbonates used in this invention are also well known to those skilled in the art and are prepared by reacting the dihydric compound with phosgene in the presence of a trihydric and/or tetrahydric compound as illustrated in U.S. Pat. No. 3,544,514, incorporated herein by reference.

When a carbonate ester is used as the carbonate precursor in the polymer forming reaction, the materials are reacted at temperatures of from 100° C. or higher for times varying from 1 to 15 hours. Under such conditions ester interchange occurs between the carbonate ester and the multi-hydric compound used. The ester interchange is advantageously done at reduced pressures of the order of from about 10 to about 100 mm of mercury The preferred carbonate polymer is prepared using a dihydric phenol, preferably Bisphenol A, as the multi-hydric compound.

It is, of course, possible to employ two or more different multi-hydric compounds or a multi-hydric compound in combination with a glycol, a hydroxy terminated polyester, or a dibasic acid in the event a carbonate copolymer rather than a homopolymer is desired for use in the preparation of the carbonate polymer mixtures of the invention. Also mixtures of various carbonate polymers (including mixtures with polyester) may be employed.

Also included in the condensation polymers suitable for arylcyclobutene functionalization according to the present invention are the polycarbonate/polyester copolymers of the types disclosed in and prepared according to U.S. Pat. Nos. 3,169,121, 4,105,633, 4,156,069 and 4,260,731 which are incorporated herein by reference, as well as mixtures of polycarbonates and polycarbonate/polyester copolymers.

In general, the polyesters and copolyesters suitable for arylcyclobutene functionalization can be prepared from one or more multi-hydric compounds (including derivatives thereof such as metal phenolates of diphenols) by reacting multi-hydric compound(s) such as a dihydric phenol with a polyester precursor. See for example the Encyclopedia of Polymer Science and Engineering, Vol. 12, "Polyesters", p. 1 et. seq. (1987) and *High Performance Polymers: Their Origin and Development*, "History of Polyarylates", pp. 95 to 103 (1986). Melt, solution and interfacial processes for the preparation of these polyesters and copolyesters are known and can similarly be employed to prepare their arylcyclobutene-functionalized counterparts. See for example, U.S. Pat. Nos. 2,465,319; 3,047,539; 3,216,970; 3,756,986; 3,946,091; 4,049,629 and 4,137,278, all of which are incorporated herein by reference. In particular, U.S. Pat. Nos. 4,137,278 and 3,946,091 disclose melt polymerization techniques; U.S. Pat. Nos. 4,049,629 and 3,946,091 disclose solution polymerization techniques; and U.S. Pat. Nos. 3,946,091 and 3,216,970 disclose interfacial polymerization techniques, which techniques could preferably be employed to prepare polyester resins.

The preferred polyesters for arylcyclobutene functionalization according to the present invention, are generally prepared by condensing a polyester precursor, preferably selected from the group of aromatic or aliphatic dicarboxylic acids or their acid chlorides, with dihydric compounds, preferably diols, more preferably diphenols. More preferably the polyester precursor is selected from the group of aromatic dicarboxylic acids or their acid chlorides. Suitable dicarboxylic acids include, for example, the following acids or their corresponding acid chlorides: terephthalic acid, isophthalic acid, naphthalenedicarboxylic acid, diphenyletherdicarboxylic acid, diphenyldicarboxylic acid, diphenylsulfonedicarboxylic acid, diphenoxyethanedicarboxylic acid, and the like. Most preferred dicarboxylic acids for preparing polyesters according to the process of the present invention are aromatic dicarboxylic acids, and most preferred are terephthalic acid and isophthalic acid.

The diols suitable for preparation of the polyesters include, for example, ethylene glycol, 1,3-propylene glycol, 1,4-butanediol, 1,5-pentanediol, 1,6-hexanediol, cyclohexane dimethylol, the dihydric phenols mentioned above for use in preparation of carbonate polymers and the like. Preferred aliphatic diols for preparation of polyesters according to the process of the present invention are ethylene glycol and 1,3-propylene glycol.

A preferred polyester is characterized by repeated units corresponding to the general formula:

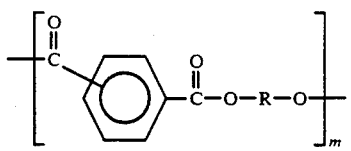

wherein R is a divalent remnant of one or more of the above mentioned dihydric compounds and m is the degree of polymerization, typically in the ranges disclosed for n above, preferably from about 2 to about 200, more preferably in the range of from about 3 to about 100.

Polyethylene terephthalate and polybutylene terephthalate are preferred polyesters for arylcyclobutene functionalization according to the process of the present invention. Other preferred polyesters for aryleyclobutene functionalization according to the process of the present invention include the polyarylates wherein R in Formula II above is a diphenol remnant.

By the term polyester, as used in the present invention, is also contemplated copolyesters, which may be prepared by cocondensing one or more dicarboxylic acids or their acid chlorides with one or more diols.

Specific methods of preparing aromatic polyesters and copolyesters which can be adapted for arylcyclobutene functionalization according to the process of the present invention are more fully set forth in U.S. Pat. Nos. 2,465,319 and 3,047,539, which are hereby incorporated in their entirety by reference thereto.

According to the process of the present invention, the backbone chains of all or part of the condensation polymers as described above are then provided with terminal arylcyclobutene moieties. With the exception of the terminal arylcyclobutene moieties, it is desirable to avoid arylcyclobutene moieties which are otherwise pendant from the polymer backbone to the extent that their irregular and inconsistent distribution along the polymer molecules detrimentally affects the polymer properties, such as by causing gels or reduced physical properties. According to the present invention condensation polymers are obtained where the arylcyclobutene moieties consist essentially of terminal arylcyclobutene moieties and more preferably there are essentially no pendant arylcyclobutene moieties In general an arylcyclobutene terminated condensation polymer corresponds to the formula III below:

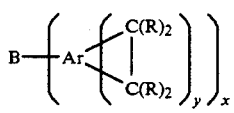

wherein B is a condensation polymer, Ar is an aromatic radical which may be substituted with an electron-withdrawing substituent or electron-donating substituent, the carbon atoms represented by C are bonded to adjacent carbon atoms of the aromatic radical Ar, R is independently in each occurrence hydrogen or an electron-withdrawing substituent or electron-donating substituent; x is an integer of 1 or greater, and y is an integer of 1 or greater, preferably 1. For example, a benzocyclobutene-functionalized condensation polymer prepared according to the process of the present invention corresponds to the following formula IV:

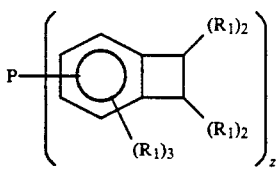

IV wherein P is a condensation polymer, $R_1$ is independently in each occurrence hydrogen or an electron-withdrawing substituent or electron-donating substituent: z is an integer of 1 or greater. Benzocyclobutene, represented by formula IV above where there is no pendant condensation polymer and $R_1$ is always hydrogen, is also referred to as bicyclo[4.2.0]-octa-1,3,5-triene.

According to the process of the present invention, the backbone chains of all or part of the condensation polymer molecules are provided with terminal arylcyclobutene moieties by the use of an arylcyclobutene-functionalized chain terminating compound in a condensation polymer polymerization reaction Compounds suitable for use as chain terminating compounds in condensation polymerization processes are well known in the literature. Similarly, techniques for preparing arylcyclobutene-containing molecules are well known in the literature, for example U.S. Pat. Nos. 4,540,763 and 4,708,994: both of which are incorporated by reference herein.

In arylcyclobutene-functionalized chain terminating compounds the arylcyclobutene moieties are located on molecules which react into but terminate the growing condensation polymer molecules. For example, arylcyclobutene-containing molecules with a single acyl chloride or hydroxy functionality are desirably employed in the condensation polymer polymerization process. For example, in U.S. Pat. No. 4,540,763 acid chloride functionalized and hydroxy functionalized arylcyclobutene compounds are described. See also Lloyd et al., *Tetrahedron*, vol. 21, pp. 2281–2288, (1965) where hydroxybenzocyclobutene is shown. Hydroxybenzocyclobutene, and particularly 4-hydroxybenzocyclobutene, is a preferable arylcyclobutene-functionalized chain terminating compound for use in preparing the condensation polymers according to the present invention. It should be noted that 4-hydroxybenzocyclobutene is also sometimes referred to as 3-hydroxy-bicyclo[4.2.0]-octa-1,3,5-triene. The hydroxy moiety in hydroxybenzocyclobutene reacts very effectively in the condensation polymerization process to provide the desired levels of terminal benzocyclobutene moiety.

As mentioned above, the condensation polymerization process of the present invention can comprise the steps of:
  a. supplying to a reaction vessel a reaction mixture comprising (i) a multi-hydric compound: (ii) a condensation polymer precursor: and (iii) about 0.01 to about 1 mole of arylcyclobutene chain terminating compound per mole of multi-hydric compound: (i), (ii) or (iii) being supplied independently or in combinations of two or more :
  b. maintaining the reaction mixture under condensation polymerization conditions: and
  c. recovering from the reaction mixture a condensation polymer having terminal arylcyclobutene moieties.

For practicing the condensation polymerization process of the present invention, the general steps of supplying a reaction mixture to a reaction vessel, maintaining the reaction mixture under condensation polymerization conditions, and recovering from the reaction mixture a condensation polymer are generally to those skilled in this art. In the process according to the present invention, however, about 0.01 to about 1 mole of arylcyclobutene chain terminating compound per mole of multi-hydric compound is supplied to the reaction mixture either independently or in combination with the multi-hydric compound and/or condensation polymer precursor. Unlike other techniques for incorporating the arylcyclobutene groups, separate polymer preparation and functionalization steps are not used. Moreover, as compared to the other techniques, the arylcyclobutene groups are more efficiently utilized in the process and preferentially located and incorporated into the polymer for optimized product properties and maximum benefit from the expensive arylcyclobutene component.

For the practice of this process it has been found preferable to use arylcyclobutene chain terminating compounds according to the following formula V:

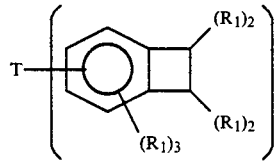

V wherein T is a condensation reactive moiety, preferably an hydroxyl (—OH) or an acyl chloride according to the following formula VI:

VI and $R_1$ is independently in each occurrence a hydrogen radical or an electron-withdrawing substituent or an electron-donating substituent, and is preferably a hydrogen radical in each occurrence. Preferably the arylcyclobutene chain terminating compound is 4-hydroxybenzocyclobutene (3-hydroxy-bicyclo[4.2.0]-octa-1,3,5-triene) wherein T is a hydroxyl and $R_1$ is a hydrogen radical in each occurrence.

By controlling the overall and relative amounts of the arylcyclobutene chain terminating compound and any other condensation polymer terminating compounds employed, the concentration of the arylcyclobutene groups and the molecular weight of the condensation polymer can be optimized for a particular set of properties. In this way, the total concentration of terminating compound(s) statistically determines the chain length of the condensation polymer molecules. The amount of the arylcyclobutene chain terminating compound relative to the amount of any other chain terminating compound(s) will determine, on the average, what percentage of the condensation polymer molecule ends will be terminated with an arylcyclobutene moiety and thus the amount of branching and/or crosslinking that will take place.

In cases where it is desired to have complete arylcyclobutene chain termination in the condensation polymers, it is clear that the use of any other chain terminating compounds is to be avoided. For linear condensation polymers, complete arylcyclobutene chain termination means that the polymer molecule is terminated at both ends with the arylcyclobutene moiety and will provide a thoroughly crosslinked polymer composition upon activation of the crosslinking reaction. Condensation polymers having a relatively low degree of polymerization and complete chain termination with arylcyclobutene moieties are preferred in situations where a processable polymer is desired which has a very low initial melt viscosity prior to crosslinking but which can be easily crosslinked to provide sufficient toughness, solvent resistance and heat resistance.

It should also be noted that branched condensation polymers can be prepared by the use of branching compounds having three or more hydroxyl groups in the process according to the present invention. In these cases the relative concentrations of a chain-terminating arylcyclobutene compounds and any other chain-terminating compounds can be determined to provide the theoretical amount which would be required to provide the desired molecular weight and percentage of chain ends with a terminal arylcyclobutene moiety.

Condensation polymers having a relatively low molecular weight prior to crosslinking and being completely terminated with all arylcyclobutene terminal groups can be very easily prepared in the process according to the present invention. These polymers can desirably be employed in applications where the molten polymer must flow quickly and easily into a mold, for example, relatively large, complicated molds. Then, upon further heating and crosslinking, in the mold or subsequently, the shaped articles possess good levels of toughness and other properties. It is very unexpected to be able to obtain a readily processable polymer which can be crosslinked to such a high degree and still provide shaped polymer articles which are relatively tough and heat and solvent resistant.

When using a hydroxyl or acyl chloride arylcyclobutene monomer to completely terminate condensation polymers in an interfacial polymerization process it has been found to be suitable to employ a mole ratio of at least about 0.01 mole arylcyclobutene compound per mole of the multi-hydric compound to obtain the desired condensation polymer molecular weight. Preferably the mole ratio of the arylcyclobutene compound per mole of the multi-hydric compound is at least about 0.02, more preferably at least about 0.03 and most preferably at least about 0.1. With regard to the maximum levels, it has been found that the mole ratio of the arylcyclobutene compound per mole of the multi-hydric phenol compound is desirably less than or equal to to about 1, preferably less than or equal to 0.99, more preferably less than or equal to 0.5.

For example, when preparing a carbonate polymer in an interfacial-type polymerization process using hydroxybenzocyclobutene, a precursor compound such as phosgene and a dihydric phenolic compound such as bisphenol A, a molar ratio of 1 mole hydroxybenzocyclobutene per mole of dihydric phenolic compound results in a degree of polymerization of 2, based on dihydric compound determined prior to the crosslinking of the polymer, as calculated by the known Flory equations. A molar ratio of 0.03 mole hydroxybenzocyclobutene per mole of dihydric phenolic compound can be used to obtain a degree of polymerization of 34 when using these compounds to prepare a carbonate polymer which is completely terminated with the arylcyclobutene moiety.

As mentioned above, one embodiment of the present invention includes the preparation of polymers where less than all of the chain ends are terminated with the arylcyclobutene moiety. Since the arylcyclobutene moieties react with multiple other arylcyclobutene moieties upon activation, the resulting condensation polymer will be branched around a connecting point of inter-reacted arylcyclobutene moieties. It has been found that very desirable branched condensation polymers can be provided by this partial crosslinking (i.e., branching) of the condensation polymer via the arylcyclobutene reaction. In this embodiment of the present invention an arylcyclobutene chain terminating compound is employed in the polymerization process together with one or more other chain terminating compound(s).

With regard to the preparation of aromatic condensation polymers which are to be branched using the arylcyclobutene moiety and used in applications where the currently available branched resins are utilized, it is desired to use chain terminating compound (arylcyclobutene and other) in total amounts in the range of from about 0.04 to about 0.01 mole per mole of multihydric aromatic compound. Within this range of chain terminating compound amounts, the desired amount of branching, typically from 0.01 to 0.05 branches per polymer molecule, is then determined by the relative amounts of the arylcyclobutene and other type chain terminating compound which are employed.

In general, to obtain a noticeable effect from the branching in a condensation polymer where the desired molecular weight is in the range of from about 16,000 to about 65,000, it is desirable to use at least 0.01 mole arylcyclobutene chain terminating compound per mole of additional chain terminating agent, preferably at least 0.03 and more preferably at least 0.05 mole arylcyclobutene chain terminating compound per mole of additional chain terminating agent. In general, to obtain desirable branched but not completely crosslinked condensation polymers, the arylcyclobutene chain terminating compound can be used in amounts of up to about 0.5 moles arylcyclobutene chain terminating compound per mole of additional chain terminating agent, preferably up to about 0.3 and more preferably up to about 0.2 mole arylcyclobutene chain terminating compound per mole of additional chain terminating agent.

The cyclobutene ring of the arylcyclobutene moiety can open by subjecting the functionalized polymers to sufficient heat. Typically, temperatures from about 200° C. to 300° C. are sufficient to open the ring. Polymerization solvents or catalysts are unnecessary, although a copper salt catalyst may lower the required temperature. Electromagnetic radiation, such as microwave, infrared, ultraviolet, electron beam and gamma radiation, may also be used to open the ring, but thermal radiation is preferred since it can be applied by conventional methods.

The condensation polymers according to the present invention can be employed in mixtures, alloys or blends with other polymer resins, including mixtures with other condensation polymers. In addition, other additives can be included in the condensation polymer of the present invention such as fillers (i.e., glass fibers), pigments, dyes, antioxidants, heat stabilizers, ultraviolet light absorbers, mold release agents, impact modifiers and other additives commonly employed in condensation polymer compositions.

In the following experiments the process according to the present invention is illustrated by providing polycarbonate resins ("PC") with terminal is quite surprising that the terminal arylcyclobutene moieties can be provided across a broad range of polymer molecular weights in such a consistent and efficient preparation process.

Experiments

Preparation Method A—Complete BCB Termination of PC

According to the following procedure, Preparation Method A, Experiment Nos. 2 through 9 were performed, preparing carbonate polymers with the higher levels of benzocyclobutene, i.e., BCB mole ratios of 0.06 and above.

A glass reactor was fitted with a mechanical stirrer, a baffle, a thermometer, a pH electrode connected to a pH meter/controller, a liquid inlet tube, a gas inlet tube and a gas outlet tube connected to a phosgene scrubber, the scrubber containing an aqueous solution of 50 weight percent sodium hydroxide and about 1 percent by weight triethylamine. To the reactor was added 68.5 weight parts (0.3 mole parts) bisphenol A, 2.16 weight parts (0.018 moles) 4-hydroxybenzocyclobutene (BCB-OH), 360 weight parts water and about 240 weight parts dichloromethane.

While stirring the reaction mixture there were added 48 weight parts (0.6 mole parts) of sodium hydroxide in a 50 weight percent aqueous solution followed by the addition of 37 weight parts (0.375 mole parts) of gaseous phosgene at a rate of about 1 weight part per minutes. The sodium hydroxide addition was maintained as needed to maintain a pH of about 12.5. Following the phosgene addition, 515 weight parts dichloromethane and 0.3 weight parts (1 mole percent) triethylamine were added. The reaction mixture was agitated for 20 minutes to produce a bisphenol A polycarbonate resin terminated with benzocyclobutene moieties. The pH of the mixture was reduced to about 7 by the addition of 9 weight parts of phosgene. The polymer solution was washed with 1 N HCl and with water and the polymer was then isolated.

The polymer molecular weight was determined by gel permeation chromatographic analysis, the weight average molecular weight (Mw) being 18,190. Liquid chromatographic analysis of the reaction mixture residue showed complete reaction of the 4-hydroxybenzocyclobutene. The resulting polycarbonate, before any crosslinking, was therefore determined to contain 0.06 moles benzocyclobutene per mole bisphenol A and have a degree of polymerization of about 27.

This material was compression molded at about 585° F. (307° C.) to form a crosslinked polycarbonate which was completely insoluble in dichloromethane. Differential scanning calorimetry analysis showed a glass transition temperature (Tg) of 165° C. The composition is summarized below in Table I as Experiment No. 2 and the physical properties are shown in Table II.

Using the process as described above, a series of arylcyclobutene terminated carbonate polymers having a range of molecular weights and higher arylcyclobutene concentrations were prepared using the indicated amounts of 4-hydroxybenzocyclobutene ("BCB-OH") and bisphenol A ("BPA") as shown in Experiments 3 through 9 in Table I. In Table I the ratio of the moles hydroxybenzocyclobutene to the moles of bisphenol A is shown as "BCB Mole Ratio." As shown in Table I, varying the amounts of BCB results in the indicated range of polymer compositions and molecular weights. Table I shows the correlation between the molecular weight of the resulting polymer (Mw and Mn), the degree of polymerization (n) and the mole ratio of arylcyclobutene to multi-hydric compound. Table II further shows the very desirable property combinations in the resulting crosslinked polymer compositions.

Preparation Method B—Complete BCB Termination of PC

According to Preparation Method B, similar to Preparation Method A, Experiment No. 1 was performed, preparing a carbonate polymer with a BCB Mole Ratio of 0.03, having a lower BCB Mole Ratio and higher molecular weight.

To the reactor was added 68.5 weight parts (0.3 mole parts) bisphenol A and 360 weight parts water. With stirring 53 weight parts (0.66 mole parts) of sodium hydroxide in the form of a 50% aqueous solution was added followed by 38 weight parts (0.39 mole parts) phosgene at about 1 weight part per minute. Then 210 weight parts dichloromethane and 1.08 weight parts (0.009 mole parts) 4-hydroxybenzocyclobutene (BCB-OH) were added and the mixture was stirred for 2 minutes. The pH of the mixture was increased to 12.5 with the addition of sodium hydroxide in the form of a 50% aqueous solution and 360 weight parts dichloromethane and 0.10 weight parts (0.001 mole parts) triethylamine were added. The mixture was agitated for 30 minutes with addition of 50% sodium hydroxide aqueous solution to maintain a pH of about 12.5. The pH of the mixture was then reduced to about 7 with addition of 19 weight parts phosgene to produce the BCB terminated polycarbonate.

The polymer solution was washed with 1 N HCl and with water and then isolated. Gel permeation chromatographic analysis gave a weight average molecular weight (Mw) of 31,967 and the liquid chromatographic analysis of the reaction mixture residue showed complete reaction of BCB—OH. The resulting polymer was compression molded at about 585° F. (307° C.) to form a crosslinked polycarbonate which was completely insoluble in dichloromethane (100% gel). Differential scanning calorimetry analysis showed a glass transition temperature (Tg) of 160° C. This composition is summarized below in Table I as Experiment No. 1 and further physical properties are shown below in Table II.

For the polymer analysis and evaluations indicated in Table II standard experimental and test methods were used. The Mw and Mn were determined on the uncrosslinked samples by gel permeation chromatographic analysis. The glass transition temperatures (Tg) of these materials were determined by differential scanning calorimetry analysis on samples that had been heated and thus crosslinked at about 350° C.

The tensile testing is performed on 1.6 millimeter (mm), i.e., 1/16 inch, samples that have been compression molded at 307° C. The analyses were performed according to ASTM D-638 on type V sample dimensions. The tensile modulus is shown as "Ten Mod" and the value given in megaPascals (MPa) with the value in kilopounds per square inch (kpsi) being given in parentheses. The stress required to the point of sample yield and sample breaking are shown as "Yield stress" and "Break stress" and the values are given in MPa with the value in kpsi being given in parentheses. The percent of sample elongation at sample yield and sample break are shown as "Yield elong" and "Break elong" with the values shown being the percentages of original sample length that the sample has been elongated. The flexural modulus ("Flex Mod") is tested according to ASTM D-790 and given in MPa with the value in kpsi being given in parentheses.

The notched Izod impact resistance is tested according to ASTM D-256-72A on on 3.18 millimeter (1/8 inch) samples that have been compression molded at 307° C. The results ("N. Izod") are given in Joules per meter (J/m) with the results in foot pounds per inch (ft lb/in) being given in parentheses.

The percent swelling (% Swell) shows the resistance to solvent of the polymer and was measured on 0.254 mm (1/100 inch) film samples soaked in dichloromethane. The indicated results are the percentage increase in the polymer surface area due to solvent absorption. All of the samples were found to be insoluble in dichloromethane.

Thermogravimetric analysis (TGA) is used to measure the char yield ("%Char"), the weight percentage of the residue remaining after heating to 800° C. in air and the decomposition temperature ("Td"), the temperature at which 5% of the sample material is lost. These results show the good thermal stability of the polymers according to the present invention.

The resistance to ignition of the polymer compositions is shown by the Limiting Oxygen Index (LOI) and UL-94 tests performed according to ASTM A-2863-87 and D-4804-88 respectively on 3.18 millimeter (1/8 inch) samples.

The coefficient of linear thermal expansion ("CLTE") is measured according to ASTM D-696 and is reported as a factor of $10^{-5}$ per degree Celsius ($\times 10^{-5}$/°C.) and, in parentheses, as a factor of $10^{-5}$ per degree Fahrenheit ($\times 10^{-5}$/°F.).

The scratch hardness testing ("Hardness") shows the abrasion resistance of the samples and is tested according to ASTM D-3363 with H being the hardest and F, HB, B, 2B and 3B indicating progressively less hardness. As shown, a typical carbonate polymer has a hardness value of about 3B and a hardness value of B is recognized to be significantly better hardness than standard carbonate polymers.

TABLE I

Composition Data; Hydroxy BCB Process

| Experiment No. | PC Control | 1 | 2 | 3 | 4 | 5 | 6 | 7 | 8 | 9 |
|---|---|---|---|---|---|---|---|---|---|---|
| Prep Method | | B | A | A | A | A | A | A | A | A |
| BPA (wt parts) | | 68.5 | 68.5 | 68.5 | 68.5 | 68.5 | 68.5 | 68.5 | 68.5 | 68.5 |
| BPA (mole parts) | | 0.3 | 0.3 | 0.3 | 0.3 | 0.3 | 0.3 | 0.3 | 0.3 | 0.3 |
| BCB-OH (wt parts) | — | 1.08 | 2.16 | 3.6 | 7.2 | 10.8 | 14.4 | 21.6 | 28.8 | 36 |
| BCB-OH (mole parts) | — | 0.009 | 0.018 | 0.03 | 0.06 | 0.09 | 0.12 | 0.18 | 0.24 | 0.3 |
| BCB Mole Ratio | 0 | 0.03 | 0.06 | 0.1 | 0.2 | 0.3 | 0.4 | 0.6 | 0.8 | 1 |
| Mw | 30000 | 31894 | 18190 | 11634 | 6057 | 4128 | 3105 | 2088 | 1451 | 1327 |
| Mn | 12000 | 11803 | 6951 | 4518 | 2072 | 1408 | 927 | 718 | 578 | 500 |
| Mw/Mn | 2.50 | 2.70 | 2.62 | 2.58 | 2.92 | 2.93 | 3.35 | 2.91 | 2.80 | 2.65 |
| n (degree of polymer'n) | 34 | 34 | 27 | 11 | 6 | 4.3 | 3.5 | 2.7 | 2.3 | 2 |

TABLE II

Property Data

| Experiment No. | PC Control | 1 | 2 | 3 | 4 | 5 | 6 | 7 | 8 | 9 |
|---|---|---|---|---|---|---|---|---|---|---|
| BCB Mole Ratio | 0 | 0.03 | 0.06 | 0.1 | 0.2 | 0.3 | 0.4 | 0.6 | 0.8 | 1 |
| Mw | 30000 | 31894 | 18190 | 11634 | 6057 | 4128 | 3105 | 2088 | 1451 | 1327 |
| n | 34 | 34 | 27 | 11 | 6 | 4.3 | 3.5 | 2.7 | 2.3 | 2 |
| Tg(C) | 150 | 160 | 165 | 170 | 176 | 181 | 180 | 194 | 198 | 207 |
| Ten Mod in M Pa (kpsi) | 1860 (270) | 1950 (283) | 1930 (280) | 2000 (290) | 1960 (285) | 2040 (296) | 2221 (322) | 2262 (328) | 2255 (327) | 2262 (328) |
| Yield stress K Pa (kpsi) | 58.6 (8.5) | 59.3 (8.6) | 61.4 (8.9) | 62.1 (9.0) | 62.1 (9.0) | 66.2 (9.6) | 71.1 (10.3) | 79.3 (11.5) | 82.1 (11.9) | 85.5 (12.4) |
| Yield elong. | 15 | 16 | 15 | 16 | 16 | 16 | 16 | 13 | 13 | 14 |
| Break stress K Pa (kpsi) | 62.1 (9.0) | 55.2 (8.0) | 53.8 (7.8) | 48.3 (7.0) | 49.7 (7.2) | 55.2 (8.0) | 61.4 (8.9) | 75.2 (10.9) | 81.4 (11.8) | 85.5 (12.4) |
| Break elong. | 200 | 111 | 40 | 38 | 31 | 23 | 24 | 16 | 14 | 14 |
| Flex Mod in K Pa (kpsi) | 2660 (386) | — | — | 2430 (352) | — | — | 2640 (383) | — | — | — |
| N. Izod in J/m (ft lb/in.) | 802 (15) | 262 (4.9) | 257 (4.8) | 235 (4.4) | 241 (4.5) | 198 (3.7) | 139 (2.6) | 59 (1.1) | 53 (1.0) | — |
| % swell CH2CL2 | soluble | 148 | 105 | 64 | 56 | 33 | 39 | 20 | 13 | 18 |
| TGA-% Char | 20 | 20 | — | — | — | — | — | — | — | 27 |
| Td (°C.) | 450 | 450 | | | | | | | | 415 |
| LOI/UL-94 | 27/V-2 | 42/V-0 39/V-0[1] | 42/V-0 | — | — | — | — | —/V-0 | —/V-0 | — |
| CLTE | | | — | — | — | — | | — | — | — |
| ($\times 10^{-5}$/°C.) | 7.1 | 7.1 | | | | | 6.9 | | | |
| ($\times 10^{-5}$/°F.) | 4.0 | 4.0 | | | | | 3.9 | | | |

TABLE II-continued

| Experiment No. | PC Control | Property Data | | | | | | | | |
|---|---|---|---|---|---|---|---|---|---|---|
| | | 1 | 2 | 3 | 4 | 5 | 6 | 7 | 8 | 9 |
| Hardness | 3B | 3B | 2B | 2B | B | HB | HB | F | F | H |

[1] Molded at 200° C. without crosslinking the polymer.

As can be seen in Table I, a high mole ratio of arylcyclobutene to dihydric phenol produces a carbonate polymer having a low degree of polymerization and a low molecular weight. As shown in Table II, however, the physical properties of resulting molded articles tested after the crosslinking of the polymer composition are surprisingly good. One skilled in this area of technology would generally expect a polymer that was crosslinked to such a degree to be very brittle and have low impact resistance.

Preparation Method C—Partial BCB Termination of PC

In Experiment 10 the procedures as described for Preparation Method A above were repeated using 0.13 weight parts (0.0011 mole parts) of 4-hydroxybenzocyclobutene and 1.42 weight parts (0.0095 mole parts) of p-tertiary-butylphenol as an additional chain terminating compound. The prebranching molecular weight (Mw) prior to the activation of the benzocyclobutene bonding was 29,797. The polymer shear sensitivity was determined by measurement of melt viscosities at shear rates between 0.01 and 100 radians per second at 280° C. The shear sensitivity index, R*, is defined as the ratio of the melt viscosities at 1 and 100 radians per second. Among other things, the R* value is an indication of the blow moldability of the polymer, branched polycarbonates being generally recognized as superior in blow molding applications to linear polycarbonate resins. The following Table III compares the properties of the branched polycarbonate according to the present invention with the properties of a linear bisphenol A polycarbonate resin.

TABLE III

| Branched Polycarbonate Property Data | | |
|---|---|---|
| Experiment No. | PC Control | 10 |
| BPA (wt parts) | | 68.5 |
| BPA (mole parts) | | 0.3 |
| BCB-OH (wt parts) | — | 0.13 |
| BCB-OH (mole parts) | — | 0.0011 |
| p-t-butyl phenol (wt parts) | | 1.42 |
| p-t-butyl phenol (mole parts) | | 0.0095 |
| BCB Mole Ratio per Mole Dihydric Compound (BPA) | 0 | .0037 |
| BCB Mole Ratio per Mole Other Chain Terminator | NA | 0.1 |
| Mw | 29,400 | 29,797 |
| n (degree of polymer'n) | 34 | 34 |
| Tg (C) | 150 | 154 |
| R* | 1.27 | 1.64 |

Preparation Method D - BCB Termination Via Acyl Chloride

In a further experiment (Experiment 11) the acyl chloride of benzocyclobutene ("BCB-COCl") was used to prepare a functionalized polycarbonate. A glass reactor was fitted with a mechanical stirrer, a stirrer baffle, a thermometer, a pH electrode connected to a Fisher Model 805 pH meter/controller, a caustic inlet tube, a phosgene inlet and a gas outlet tube connected to a phosgene scrubber, the scrubber containing an aqueous solution of 50 weight percent sodium hydroxide and about 1 percent by weight triethylamine. The reactor and solvents were thoroughly purged with nitrogen prior to phosgenation. The stirrer was set to give turbulent mixing throughout the vessel. The reactor temperature was maintained below 30° C.

To the reactor as described above was added 68.5 weight parts (0.3 mole parts) bisphenol A, 1.50 weight parts (0.009 mole parts) benzocyclobutene-4-carbonyl chloride (BCB-COCl), 360 weight parts water, and 240 weight parts dichloromethane. With stirring 48 weight parts (0.6 mole parts) of sodium hydroxide in a 50 weight percent aqueous solution were added, followed by the addition of 37 weight parts (0.375 mole parts) phosgene at about 1 weight part per minute. Sodium hydroxide was added to maintain a pH of about 12.5. Then 515 weight parts dichloromethane and 0.30 weight parts (1 mole percent) triethylamine were added.

The mixture was agitated for 20 minutes to produce the BCB terminated polycarbonate. The pH of the mixture was reduced to about 7 with addition of 9 weight parts of phosgene. The polymer solution was washed with 1 N HCl and with water and the polymer was then isolated. Gel permeation chromatographic analysis gave a weight average molecular weight (Mw) of 32,814 and Liquid chromatographic analysis of the reaction mixture residue showed complete reaction of BCB-COCl. The results of this Experiment 11 are shown in Table IV below.

TABLE IV

| Acyl Chloride-based polymer | | |
|---|---|---|
| Experiment No. | PC Control | 11 |
| BPA (wt parts) | NA | 68.5 |
| BPA (mole parts) | NA | 0.3 |
| BCB-COCl (wt parts) | — | 1.5 |
| BCB-COCl (mole parts) | — | 0.009 |
| BCB Mole Ratio | 0 | 0.03 |
| Mw | 30000 | 32,800 |
| Mn | 12000 | 10,900 |
| Mw/Mn | 2.50 | 3.02 |
| n (degree of polymer'n) | 34 | 34 |
| Tg (C) | 150 | 166 |
| % swell CH2CL2 | soluble | 225 |

What is claimed is:

1. A process for the preparation of a condensation polymer based upon one or more multihydric compounds which condensation polymer is selected from the group consisting of a carbonate polymer, a polyester or a polyestercarbonate and has one or more terminal arylcyclobutene moieties, the process comprising the step of adding to a condensation polymerization process either (1) one or more arylcyclobutene chain terminating compounds to have complete arylcyclobutene chain termination in the condensation polymers or (2) one or more arylcyclobutene chain terminating compounds and one or more other condensation polymer terminating compounds.

2. A process according to claim 1 wherein the condensation polymer is a carbonate polymer or a polyestercarbonate.

3. A process according to claim 1 wherein the condensation polymerization process employs an aromatic diphenol which aromatic diphenol contains one or more aromatic rings and contains as functional groups two or more hydroxyl moieties which are attached directly to a carbon atom of an aromatic ring.

4. A process according to claim 1 wherein the condensation polymerization process comprises the reaction of an aromatic diphenol and a condensation polymer precursor under condensation polymerization conditions.

5. A process according to claim 1 wherein the arylcyclobutene chain terminating compound is hydroxybenzocyclobutene or benzocyclobutene acyl chloride.

6. A process according to claim 1 wherein the condensation polymer product has an average degree of polymerization of from about 2 to about 100.

7. A process according to claim 1 wherein the condensation polymer has an average degree of polymerization of from about 3 to about 30.

8. A process according to claim 1 wherein from about 0.01 to about 1 mole of arylcyclobutene chain terminating compound is added per mole of multi-hydric compound.

9. A process according to claim 1 wherein from about 0.1 to about 0.5 mole of arylcyclobutene chain terminating compound is added per mole of multi-hydric compound.

10. A process according to claim 1 wherein the condensation polymer product has essentially complete arylcyclobutene compound chain termination and other chain terminating compounds are not used.

11. A process according to claim 1 providing, on the average, at least 2 terminal arylcyclobutene moieties per polymer molecule.

12. A process according to claim 11 wherein the condensation polymer product is linear and is terminated on both ends.

13. A process according to claim 1 providing less than complete arylcyclobutene compound chain termination.

14. A process according to claim 13 wherein an arylcyclobutene chain terminating compound and one or more additional non-arylcyclobutene chain terminating compound(s) are added.

15. A process according to claim 14 wherein the polymer is linear and has, on the average, less than 1 terminal arylcyclobutene moiety per polymer molecule.

16. A process according to claim 14 wherein at least 0.01 mole of an arylcyclobutene chain terminating compound is employed per mole of additional chain terminating agent(s).

17. A process according to claim 14 wherein up to about 0.5 moles arylcyclobutene chain terminating compound is employed per mole of additional chain terminating agent(s).

18. A process according to claim 17 wherein from about 0.1 to about 0.5 mole arylcyclobutene chain terminating compound is employed per mole of additional chain terminating agent.

19. A process according to claim 1 comprising the step of subjecting the condensation polymer product to conditions under which the arylcyclobutene moieties react with one or more other arylcyclobutene moieties to crosslink or branch the polymer.

20. A condensation polymerization process according to claim 1 comprising the steps of:
a. supplying to a reaction vessel a reaction mixture comprising (i) a multi-hydric compound; (ii) a condensation polymer precursor; and (iii) about 0.01 to about 1 mole of arylcyclobutene chain terminating compound per mole of multi-hydric compound: (i), (ii) or (iii) being supplied independently or in combinations of two or more;
b. maintaining the reaction mixture under condensation polymerization conditions; and
c. recovering from the reaction mixture a condensation polymer having terminal arylcyclobutene moieties.

21. A process according to claim 20 wherein from about 0.01 to about 1 mole of arylcyclobutene chain terminating compound is added per mole of multi-hydric compound.

22. A process according to claim 21 wherein the condensation polymer precursor is one or more of the compounds selected from the group consisting of phosgene, a haloformate, a carbonate ester, one or more dicarboxylic acids and one or more dicarboxylic acid chlorides.

23. A process according to claim 22 wherein the multi-hydric compound is a diphenol.

24. A process according to claim 1 wherein the condensation polymerization process is an interfacial process.

25. A process according to claim 24 wherein a polycarbonate or a polyester is prepared by the interfacial process.

26. A process according to claim 1 wherein the condensation polymerization process is a solution process.

27. A process according to claim 26 wherein a polycarbonate or a polyester is prepared by the solution process.

28. A process according to claim 1 wherein the condensation polymerization process is a melt process.

29. A process according to claim 28 wherein a polycarbonate or a polyester is prepared by the melt process.

30. A condensation polymerization process according to claim 20 comprising the steps of:
a. supplying to a reaction vessel a reaction mixture comprising (i) a multihydric compound; (ii) a condensation polymer precursor; (iii) about 0.01 to about 1 mole of arylcyclobutene chain terminating compound per mole of multihydric compound; and (iv) one or more other condensation polymer terminating compound(s); (i), (ii), (iii) or (iv) being supplied independently or in combinations of two or more;
b. maintaining the reaction mixture under condensation polymerization conditions; and
c. recovering from the reaction mixture a condensation polymer having terminal arylcyclobutene moieties with either (1) complete arylcyclobutene chain termination or (2) chain termination by one or more arylcyclobutene chain terminating compounds and one or more other condensation polymer terminating compounds.

* * * * *